INVENTORS.
RAYMOND S. RICHARDS
ORVILLE A. WHEELON
BY
Agent

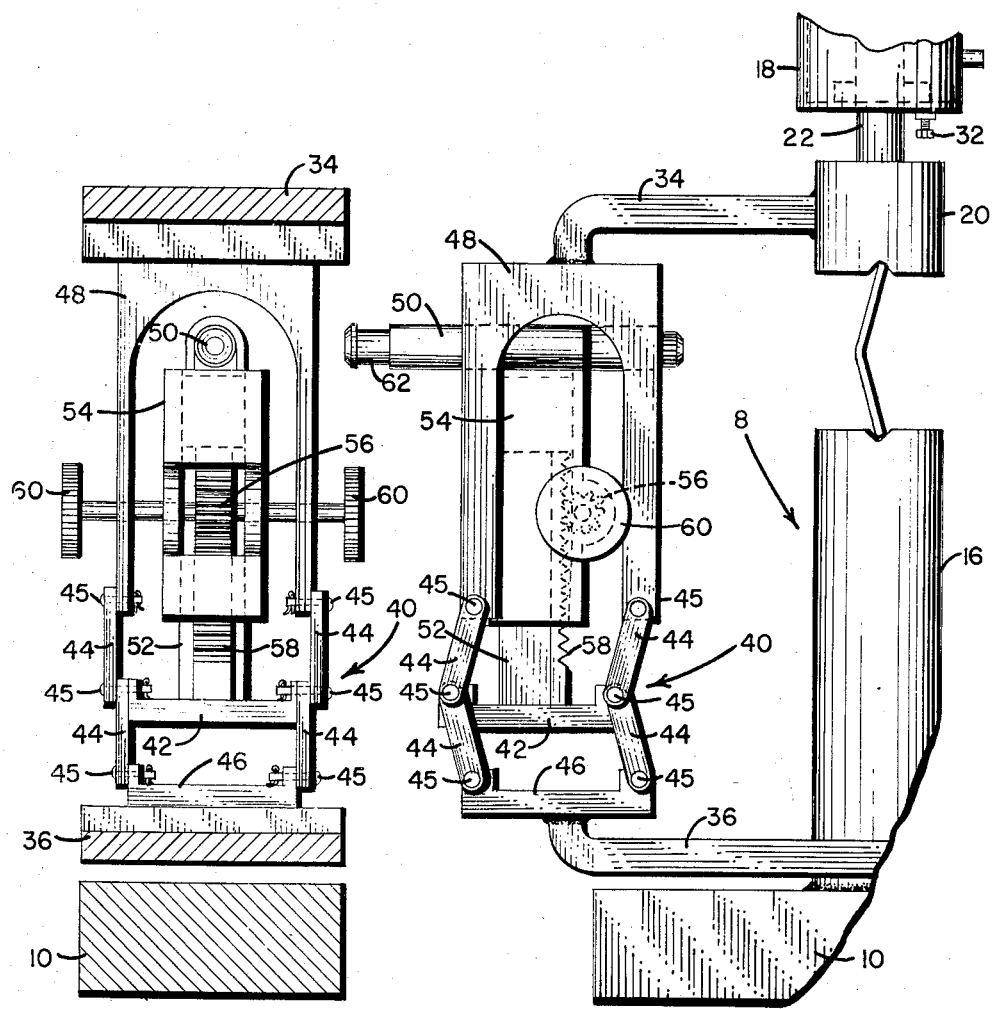

United States Patent Office 2,919,575
Patented Jan. 5, 1960

2,919,575

FREE BEND TESTING DEVICE

Raymond S. Richards, Henderson, Nev., and Orville A. Wheelon, Pacific Palisades, Calif., assignor to Titanium Metals Corporation of America, New York, N.Y., a corporation of Delaware Application November 29, 1957, Serial No. 699,662

3 Claims. (Cl. 73—100)

This invention relates to a device for free bend testing of strip specimens of various materials including metals and metallic alloys.

Previous devices employed for free bend testing have not provided simple construction for applying bending forces combined with ready observation of the specimen during test bending.

It is therefore the object of this invention to provide an improved free bend testing device. A further object of this invention is to provide a device for free bend testing strip specimens in which continued and accurate observation may be made of the specimen during bending. These and other objects of this invention will be apparent from the following description thereof and from the annexed drawings in which:

Fig. 2 is a sectional view of the device of Fig. 1, taken along the lines 2—2.

Fig. 3 illustrates the manner in which the viewing device remains sighted on the bent area of a specimen during testing.

Figure 1:
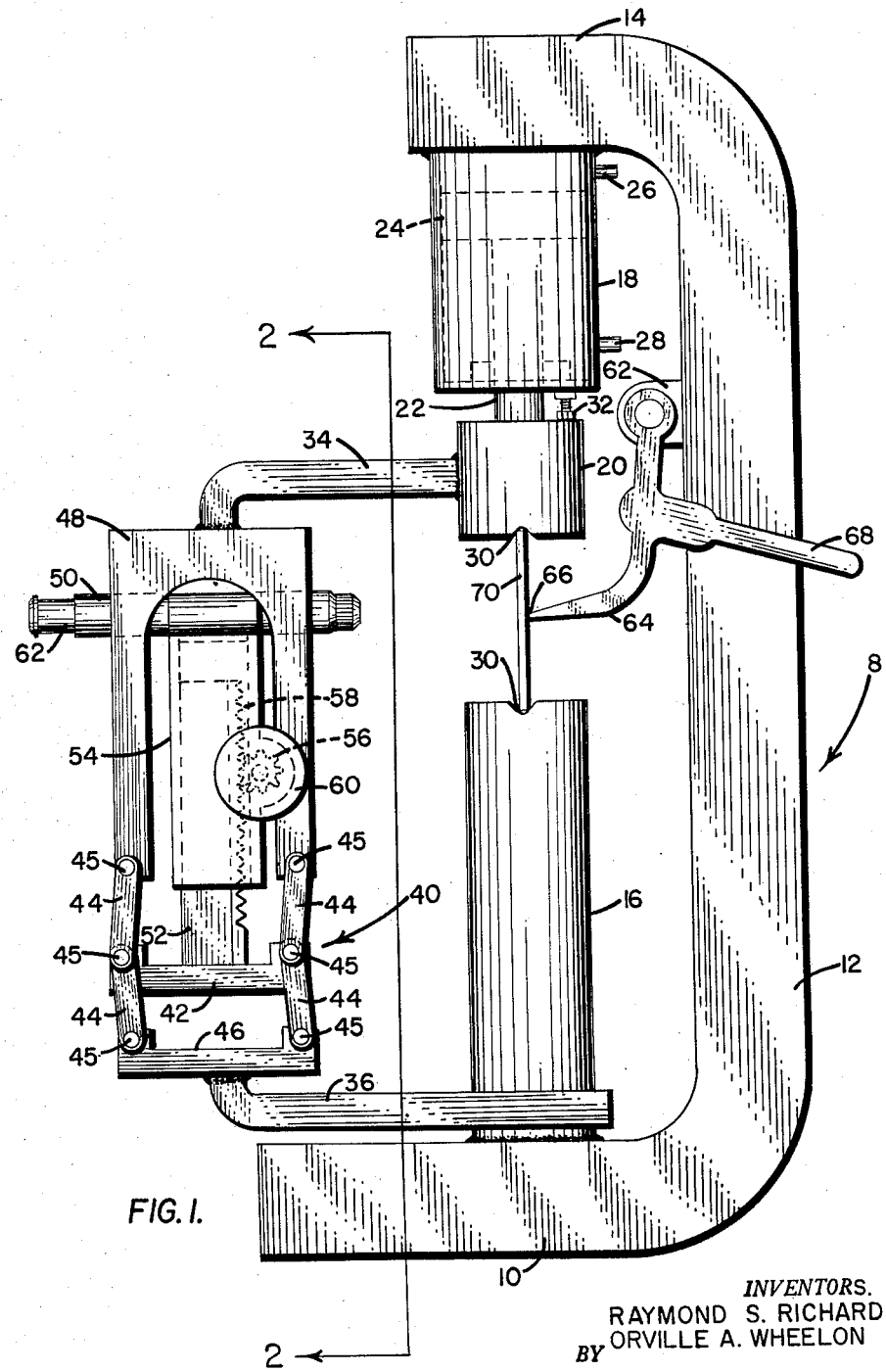
Fig. 1 shows a general side view of apparatus embodying features of this invention.

Referring now to Figs. 1 and 2, the device comprises a press indicated generally at 8 having a heavy base 10 to which is firmly attached post 12 which is in turn fastened to or made integral with upper support arm 14. Fixedly attached to base 10 is lower jaw 16.

Hydraulic cylinder 18 is attached to the underside of support arm 14 to provide actuating means for upper jaw 20 which is connected by piston rod 22 to piston 24, in cylinder 18. Hydraulic fluid is supplied to cylinder 18 either above or below piston 24 through pipe lines 26 and 28. The supply of fluid to these lines is arranged and controlled by suitable and conventional valves and oil pumping mechanism not shown. Grooves 30 are provided in the facing surfaces of upper jaw 20 and lower jaw 16 to form retaining means for a strip specimen placed between the jaws. In order to limit the upward travel of jaw 20 limit pin 32 is adjustably fastened as by threading into a boss on the lower surface of cylinder 18, as shown, to prevent the upper jaw 20 from being separated from the lower jaw 16 more than substantially the length of the strip specimen retained therebetween.

Means are provided having a double parallelogram element associated with upper jaw 20 and lower jaw 16 for mounting a viewing device which will be automatically maintained in proper sight and focus relationship with the central portion of a specimen being bent between the jaws. In the embodiment illustrated such means comprise upper arm 34 which extends outwardly from upper jaw 20 and is fixedly attached thereto, and extending outwardly in the same plane as arm 34 but fixedly attached to lower jaw 16, is corresponding lower arm 36. The ends of arms 34 and 36 are connected by a double parallelogram linkage, illustrated generally at 40 and which linkage has a central floating bar 42. Each of the end links 44 are characterized by being of effective length equal to one-half the length of the strip specimen retained by the grooves 30 between the jaws 20 and 16. The effective length of links 44 is defined as the distance between the centers of corresponding pins 45 by which they are pivotably attached to central bar 42, and to lower bracket 46 which connects the lower set of links 44 to lower arm 36, and to upper hollow elongated bracket 48 which connects the upper set of links 44 to upper arm 34.

A magnifying viewing device such as microscope 50, adapted to sight on the central portion of a specimen retained between jaws 16 and 20, is mounted on floating bar 42, preferably adjustably mounted by rack stand 52 which is attached at its base to bar 42 and over which is telescoped microscope mounting tube 54. Mounted on tube 54 is rotatable pinion 56 which engages rack 58 on stand 52. Rotation of pinion 56, conveniently by means of control wheel 60, enables the relative height of microscope mounting member 54 to be adjusted with respect to floating bar 42. Microscope 50 which is fixedly attached to the top of tube 54, may conveniently be of conventional design, the focusing thereof being accomplished by suitable longitudinal adjustment of eye piece 62.

Before operation of the device of this invention, the limit pin 32 is adjusted to abut against the top surface of upper jaw 20 when the distance between the upper and lower grooves 30 is substantially the length of the specimen to be tested, this length also being equal to twice the effective length of each of the links 44. Pin 32 preferably limits the upward movement of upper jaw 20, at a point before the vertical alignment of a pair of connected links 44 has reached dead center. The differences in length between the upper and lower jaw members and the top and bottom of the parallelogram linkage will be immaterial but such procedure will prevent the linkage from becoming immovable in dead center and will insure that lateral movement of the central floating bar 42 will always take place in the same direction. In order to insure that the specimen inserted and retained between jaws 20 and 16 will always bend in the same direction as the center floating bar movement, means are provided to apply an initial force to the specimen in this direction. In the embodiment illustrated such means comprise support bar 62 which extends from post 12 and to the free end of which is pivoted striking arm 64, whose point 66 may be forced against the specimen by angular movement of attached handle member 68.

With the jaws opened to their maximum distance as limited by pin 32, a specimen strip 70 is inserted between jaw 20 and jaw 16 with its ends engaging grooves 30. The microscope 50 is adjusted vertically by suitable rotation of wheel 60 so that its line of sight covers the central portion of the specimen 70 and is focused by suitable adjustment of eye piece 62. Then downward pressure is exerted on handle 68 to force the center of specimen 70 towards the microscope and at the same time oil is supplied to the cylinder 18 above piston 24 through pipe line 26 to result in actuation of upper jaw 20 towards lower jaw 16 which will bend specimen 70 as illustrated more clearly in Fig. 3. Due to the parallelogram linkage 40 between upper arm 34 and lower arm 36 and the unique method of mounting the viewing device 50 on the floating central bar of this parallelogram linkage, the microscope 50 will move both vertically and horizontally substantially the same distance as the central surface of the specimen 70 moves during the bending operation. This will be clear from Fig. 3 which shows the specimen partly bent and the upper and lower links 44 in angulated position with central bar 42 lowered and moved horizontally in the same direction and to the same extent that the middle bent section of specimen 70 has moved from its original vertical position.

In applying the device of this invention to test work on metallic strip specimens the first sign of incipient cracking in the bent area, considered in connection with the bend angle at the time of such incipient fracture, is often taken as a criterion of bendability. The device of this invention has important advantages in operation in that once the viewing device is focused and sighted on the bend area in the specimen no further adjustments need be made and it will follow the area and continue to remain sighted and focused thereon during the complete bending operation.

We claim:

1. A free bend tester for strip specimens comprising: a press having a fixed jaw and a movable jaw; specimen retaining means in the facing surfaces of said fixed and movable jaws; means for moving said movable jaw with relation to said fixed jaw, thereby to result in free bending of a specimen retained therebetween; a double parallelogram linkage operatively connected to said fixed and movable jaws; and a viewing device mounted on said linkage thereby to maintain sight and focus relationship between said viewing device and the central portion of the surface of a specimen being bent between said fixed and movable jaws.

2. A free bend tester for strip specimens comprising: a press having a fixed jaw and a movable jaw; specimen retaining means in the facing surfaces of said fixed and movable jaws; means for moving said movable jaw with relationship to said fixed jaw, thereby to result in free bending of a specimen retained therebetween; an arm extending outwardly from and attached to said fixed jaw and an arm extending from and attached to said movable jaw; a double parallelogram linkage, having a central floating bar, connecting the ends of said arms, the end links of said double parallelogram linkage being of effective length equal to one-half the length of the specimen retained between said fixed and movable jaws; and a viewing device mounted on said central floating bar, adapted to sight on the central portion of a specimen retained in bending position between said fixed and movable jaws.

3. A free bend tester for strip specimens comprising: a press having a fixed jaw and a movable jaw; specimen retaining means in the facing surfaces of said fixed and movable jaws; means for moving said movable jaw with relationship to said fixed jaw, thereby to result in free bending of a specimen retained therebetween; an arm extending outwardly from and attached to said fixed jaw and an arm extending from and attached to said movable jaw; a double parallelogram linkage, having a central floating bar, connecting the ends of said arms, the end links of said double parallelogram linkage being of effective length equal to one-half the length of the specimen retained between said fixed and movable jaws; and a microscope adjustably mounted on said central floating bar, adapted to sight on the central portion of a specimen retained in bending position between said fixed and movable jaws.

References Cited in the file of this patent

UNITED STATES PATENTS

| | | |
|---|---|---|
| 662,327 | Vermilye | Nov. 20, 1900 |
| 1,410,196 | Krivacs | Mar. 21, 1922 |